Patented Sept. 27, 1938

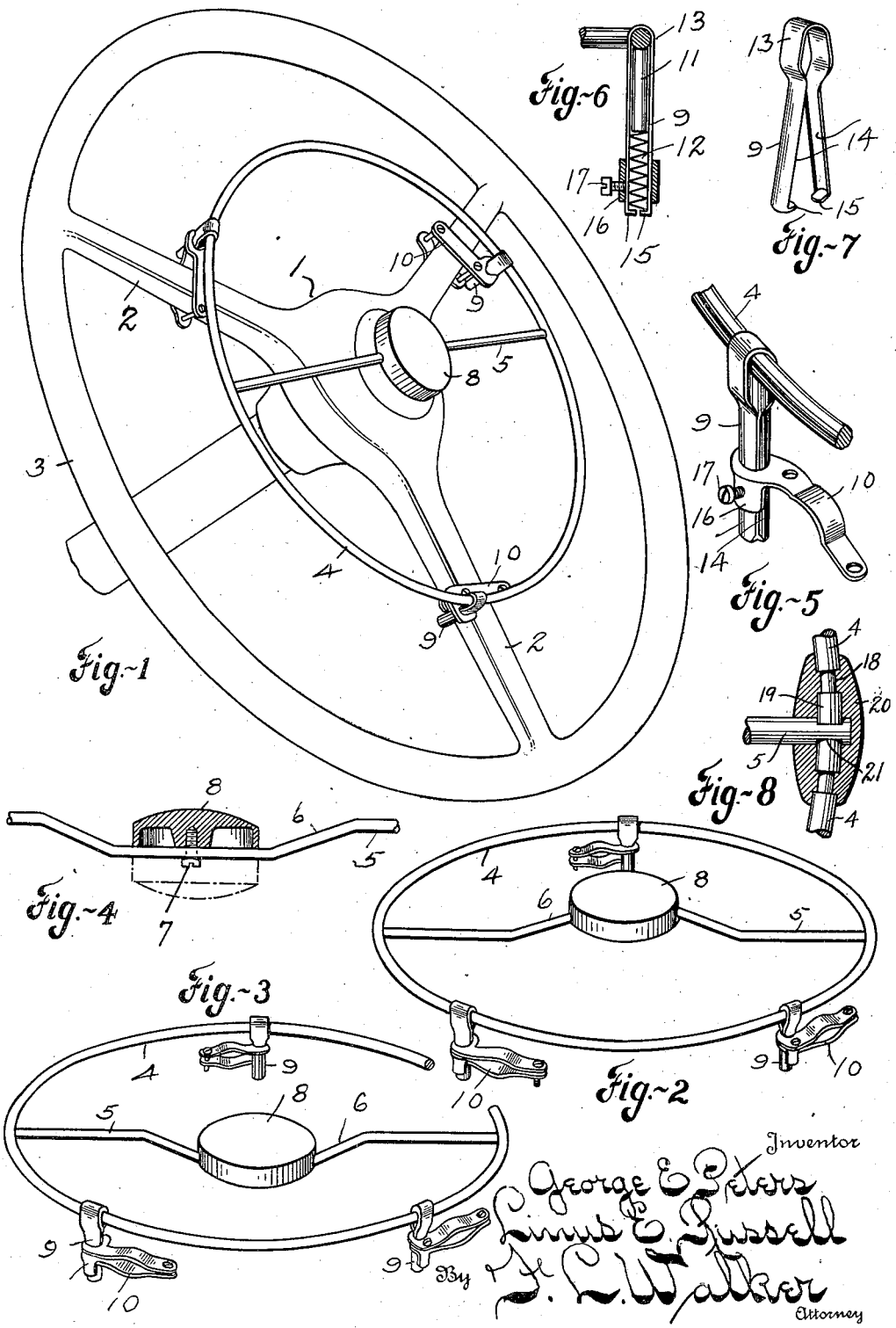

2,131,542

UNITED STATES PATENT OFFICE 2,131,542

HORN RING FOR AUTOMOBILES

George E. Peters and Linus E. Russell, Springfield, Ohio, assignors to Peters & Russell, Inc., Springfield, Ohio, a corporation of Ohio Application July 26, 1937, Serial No. 155,704

16 Claims. (Cl. 74—484)

This invention pertains to signaling apparatus, and more particularly to a universal horn operating device for automobile steering wheels, for enabling the horn to be easily and conveniently operated from any positions of the driver's hands without releasing his grasp of the steering wheel rim.

It is customary at the present time to mount the motor vehicle signal horn button concentrically upon the steering wheel. However, in an emergency when it is highly desirable and necessary that the operator retain complete control of his vehicle by maintaining his grasp of the wheel, it becomes necessary to relax his control of the steering wheel while he reaches for the horn button.

The present device is capable of universal application to steering wheels of various shapes and designs, by which the operator may conveniently operate the horn from any position upon the wheel rim while retaining complete control.

The object of the invention is to provide a horn button operator which may not only be economically manufactured but which will be quite efficient in use, uniform in its action, having relatively few operating parts and unlikely to get out of repair.

A further object of the invention is to provide a horn button operator which will be universal in its application to steering wheels of different shapes and designs, wherein the conventional horn button may be set either high or low relative to the plane of the wheel rim, and wherein the wheel spokes may be variously disposed or of different sizes and shapes.

A further object of the invention is to provide an improved resilient mounting for the operator device.

A further object of the invention is to provide for to and fro shifting, rotary and vertical adjustment of the operator mounting means to agree with various wheel designs.

A further object of the invention is to provide a reversible operator adapted to universally accommodate steering wheels having horn button placements in different planes relative to that of the wheel rim.

A further object of the invention is to provide a horn button operator which may be easily and quickly installed by unskilled persons without the use of special tools.

A further object of the invention is to provide a horn button operator having the herein disclosed structural features of advantage and meritorious characteristics.

With the above primary and other incidental objects in view as will more fully appear in the specification, the invention consists of the features of construction, the parts and combinations thereof, and the mode of operation, or their equivalents as hereinafter described and set forth the claims.

In the drawing, Fig. 1 is a perspective view of a conventional automobile steering wheel to which a horn button operator embodying the present invention has been applied. Figs. 2 and 3 are perspective views, illustrating the operator device removed from the steering wheel and in reverse positions to accommodate it to either high or low positioned horn buttons. Fig. 4 is a detail sectional view of the button operating pad or supplemental button. Fig. 5 is a perspective view of one of the mounting devices for attaching the operator to the steering wheel spoke. Fig. 6 is a vertical sectional view thereof. Fig. 7 is a detail perspective view, illustrating the mode of manufacture of the mounting device.

Like parts are indicated by similar characters of reference throughout the several views.

Referring to the drawing, 1 indicates a conventional steering wheel which may be of any particular design. Some such wheels have four spokes or arms, and some have three flexible cable arms, two of which are disposed in diametrically aligned relation. The arms or spokes 2 of the steering wheel may be of various cross sectional size and shape. Likewise, in some instances the conventional horn button is set either high above the plane of the wheel rim 3 or below such wheel rim plane, or approximately in the plane of the rim. By reversing the operator device or by shifting the mounting means circumferentially, vertically, or rotatively, all of the above variants of wheel design and many others may be easily accommodated.

In the preferred form of embodiment as illustrated in the drawing, the operator comprises an annular ring 4 having fixedly secured thereto a diametrically transverse rod 5. The transverse rod 5 is medially defleced as at 6 out of the plane of the ring, to form a relatively low or flat bight or arch. Within such bight or arch 6 the rod 5 is preferably but not necessarily flattened. Reversibly secured to such arched portion of the rod by a screw 7 extending through the flattened arch portion of the rod is a supplemental horn button or pad 8 which is preferably of ornamental appearance simulating the original horn button which it overlies. This supplemental button or pad 8 may be of various shapes, sizes and colors, and may be a molding of plastic material. It is readily attachable to the bar 5 in either of reverse positions, outside or inside the bight or arch 6 as is illustrated in Figs. 2 and 3. If the original horn button is positioned high above the plane of the wheel rim 3, the supplemental button or pad is mounted on the convex side of the rod 5, as in Fig. 2. If, to the contrary, the original horn button is in depressed relation with the wheel rim, the supplemental button 8 is mounted within the bight of the rod, as shown in Fig. 3.

The ring 4 is yieldingly mounted in upright posts 9 fixedly secured to the arms or spokes 2 of the steering wheel by clamps 10. The ring 4 extends transversely through the mounting posts which are tubular and each encloses a spring actuated plunger 11 yieldingly supported upon a helical spring 12. These mounting posts may be of any suitable construction, but for economy of manufacture they are formed by stamping from strips of sheet metal reversely bent substantially U shaped members, as shown in Fig. 7. The head or bight portion of such mounting post comprises a flat loop portion 13 of the strip, beyond which the arms 14 are reduced to concavo convex channel shape, with the ends thereof inturned at 15 to support the spring 12. The ring 4 extends through the loop forming the head portion 13 where it is engaged by the end of the plunger 11 under influence of the spring 12. The channel shaped arms 14 of the post are held together about the plunger and spring by the clamp members 10, which have holes in their ends through which the mounting post arms 14 extend. One of the clamp members has formed thereon a dependent lip 16 on which a set screw has engagement with the mounting post to retain the clamp member 10 and post in their relative positions of vertical adjustment. The clamp members are rotatively adjustable upon the mounting posts and are further vertically adjustable thereon and the posts are further slidingly adjustable circumferentially upon the ring 4.

In mounting the device, the ring may be turned with either side uppermost, and the supplemental button or pad 8 attached to the upper side, according to whether the steering wheel to which it is to be adapted embodies a relatively high or low original horn button. The mounting posts are shifted on the ring into engagement with the positions of the wheel spokes 2, and are clamped thereto by the clamp members 10. These clamps 10 may be turned to either side of the posts as is found most convenient and whichever position more readily conforms to the wheel spoke design. The set screws 17 are then loosened and the ring and posts are vertically adjusted relative to the clamps until the head of the screw 7 of the supplemental button rests firmly upon the original horn button, whereupon the screws 17 are tightened to hold the mounting posts in their positions of vertical adjustment relative to the wheel.

The ring 4 is depressible at any and all points of its circumference against the yielding resistance of the plunger 11 and spring 12. The ring is of such size that it extends in relatively close concentrically spaced relation with the wheel rim and is within easy reach of the operator's fingers while retaining grasp of the wheel rim. Upon depressing the ring 4 at one side against the resistance of the spring pressed plunger 11, the ring will fulcrum at its opposite side as a lever of the second order and will thereby exert downward pressure upon the original horn button to operate the signal horn. It is quite immaterial which portion of the operator ring is depressed. The ring tending to initially fulcrum upon the original horn button exerts upward pressure on the heads of the mounting posts at the opposite side of the ring, which being unyielding in an upward direction, becomes the fulcrum during further depression of one side of the ring, thereby transferring the work point of such leverage to the original horn button at the center of the operator ring.

The particular method of joining the ends of the member comprising the ring 4 with each other and the ends of the transverse rod 5 with the ring are not material, since they may be formed by brazing, electric welding, or mechanical interengagement. However, a mode which has proven highly satisfactory is that shown in Fig. 8. The ring 4 is formed in two semi-circular sections which are connected with each other and with the end of the transverse rod 5 by a coupling sleeve 20. The sleeve 20 is bored longitudinally to receive the ends of the ring sections and is bored transversely in intersecting relation with the longitudinal bore, but not entirely through the sleeve to receive the end of the rod 5. The rod 5 is preferably, although not necessarily, notched at 21 to receive the ends of the sections comprising the ring 4, which thereby lock the cross rod against withdrawal. The terminals of the ring sections are either peripherally grooved as at 18, or the end of the rod is upset to form a head 19. The sleeve 20 is then swedged to contract the sleeve into interlocking engagement about the head 19 and into the groove 18, thereby effectively preventing disengagement of the several parts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A horn button operator for automobile horns adapted to be mounted on the steering wheel of an automobile for actuation by the fingers of the driver without releasing grasp of the steering wheel rim, including a reversible, tiltable ring mounted in concentric spaced relation with the steering wheel rim, a rod disposed diametrically across the ring and having a medial portion thereof arched out of the plane of the ring, a supplemental horn button engageable alternately interiorly or exteriorly of the medial arched portion of the rod, a plurality of supporting posts having elongated loops through which the ring extends and slidingly adjustable circumferentially thereon, a spring pressed plunger in each supporting post against the yielding resistance of which the ring is depressible, clamp members revolubly and axially adjustable upon the supporting posts and locking means for securing the clamp members and posts in their positions of relative adjustment, said ring being free for tilting movement in any direction against the yielding resistance of at least one spring pressed plunger at one side of the ring while fulcruming on at least one mounting post at the opposite side of the ring, to thereby exert leverage upon the horn button at the center of the steering wheel to depress such button and operate a horn.

2. A signal button operator to be mounted upon an automobile steering wheel or the like for actuating a depressible signal button at the center of the wheel, including a ring to be disposed in concentric spaced relation with the steering wheel rim, means for yieldingly mounting the ring for downward movement toward the wheel but limiting the upward movement thereof away from the wheel, and a central contact member detachably carried by the ring and reversely engageable therewith in offset relation to the plane of the ring to accommodate the ring to signal buttons at different elevations relative to the wheel to depress the button by depression of the ring.

3. A signal button operator to be mounted upon an automobile steering wheel or the like for actuating a depressible signal button at the center of the wheel, including a reversible ring assembly of concavo convex form to be disposed in concentric spaced relation with the steering wheel rim in either of its reverse positions, a support for the ring at one side thereof limiting the upward movement of the ring and forming a fulcrum therefor, and a yielding depressible support for the opposite side of the ring against the yielding resistance of which the ring may be tilted relative to its fulcrum, and a button contact member centrally disposed relative to the ring and connected for movement therewith engageable in its reverse positions with steering wheel signal buttons disposed at different elevations relative to the wheel and ring for depressing the button by tilting movement of the ring.

4. A signal button operator to be mounted upon an automobile steering wheel or the like for actuating a depressible signal button at the center of the wheel, including a ring to be disposed in concentric spaced relation with the steering wheel rim, a plurality of duo-functional supports for the ring limiting the upward movement thereof and yieldingly resisting downward movement thereof, and a centrally disposed reversible contact member carried by the ring and by its reversal relative thereto engageable with steering wheel horn buttons disposed at different elevations relative to the wheel and ring for depressing the button upon tilting motion of the ring.

5. A signal button operator to be mounted upon an automobile steering wheel or the like for actuating a depressible signal button at the center of the wheel, including a reversible ring to be disposed in concentric spaced relation with the steering wheel rim an arched bar disposed transversely of the ring and attached thereto, a plurality of resilient supports for the ring engaging therewith at different radial points and yieldingly supporting the ring against downward movement in either of its reverse relations, a plurality of limiting stops for the ring having engagement therewith at different radial points, any one of which may be utilized as a fulcrum for tilting motion of the ring against a resilient support engaging the ring in spaced relation with the fulcrum stop, and contact means mountable either interiorly or exteriorly of the arch of said transverse bar engageable with steering wheel horn buttons located at different elevations relative to the wheel and ring to operate the button by the tilting motion of the ring.

6. An operator to be mounted upon the steering wheel of an automobile for actuation of a centrally disposed signal button thereon, including a reversible ring, a centrally disposed contact member carried thereby in axially offset relation with the plane of the ring enabling the operator to be accommodated to signal buttons disposed either above or below the plane of the steering wheel rim by reversal of the ring, and means for yieldingly supporting the ring upon the steering wheel at a plurality of circumferentially spaced points.

7. An operator for a centrally disposed signal button of an automobile steering wheel, including a reversible ring, a bar extending transversely across the ring and attached thereto, a portion of the bar being arched beyond the plane of the ring and a supplemental button carried by said arched portion of the bar and engageable alternately interiorly and exteriorly of such arched portion for operative engagement with the steering wheel signal button, and resilient means supporting the ring for movement relative to the steering wheel.

8. An operator for a centrally disposed signal button of an automobile steering wheel including a reversible ring to be disposed in substantially concentric spaced relation with the rim of the wheel, a centrally disposed contact element carried by the ring in axially offset relation with the plane of the ring for engagement with the steering wheel signal button, and means for resiliently supporting the ring in either of its positions of reversal for movement relative to the steering wheel to exert pressure of the contact member upon the steering wheel signal button.

9. An operator for a centrally disposed signal button of an automobile steering wheel wherein a ring is disposed in substantially concentric spaced relation with the steering wheel rim and a centrally disposed contact element is carried by the ring for engagement with the signal button of the steering wheel, characterized by a plurality of ring supports, each comprising a single length of material medially bent upon itself to form a loop and channel shaped extremities of the strip disposed in opposing contacting relation by the bending of the strip and thereby forming a spring socket, in which the ring is enclosed for relative movement limited by said loop, and a spring therein pressing the ring toward one end of such loop against the yielding resistance of which the ring is movable within the loop relative to the steering wheel.

10. An operator for a centrally disposed signal button of an automobile steering wheel including a reversible ring to be disposed in substantially concentric spaced relation with the steering wheel rim, a centrally disposed contact element carried by the ring for engagement with the signal button of a steering wheel in alternate positions of reversal of the ring, a plurality of slotted supporting posts fixedly mounted on the steering wheel for supporting the ring in either position of reversal thereof, through the slots of which the ring extends for movement in the slots substantially perpendicular to the plane of the ring, and a spring actuated plunger within each post supporting the ring in elevated position against the yielding resistance of which the ring is depressible within the limit slot of the supporting post.

11. As an article of manufacture, an operator ring for a centrally disposed signal button of an automobile steering wheel including a ring, a centrally disposed contact member carried by the ring for engagement with the steering wheel signal button, a plurality of supporting posts slidingly mounted on the ring, clamp members rotatably and longitudinally adjustable on the posts for engagement with the spokes of the steering wheel, and resilient means against the tension of which the ring is movable relative to the posts in a direction substantially perpendicular to the plane of the ring.

12. A supporting post for a signal button operator ring comprising a single strip of material medially bent reversely upon itself into substantially parallel formation, channel shaped extremities upon said strip disposed in opposing relation when the strip is bent, a tubular stem formed conjointly by said opposing channel shaped extremities of the strip and an elongated loop shaped head formed by the medial reverse bend of the strip through which the ring extends and within which the ring is capable of relative movement substantially perpendicular to the plane of the ring, and within the limits of the loop a reciprocatory plunger within the tubular stem and a spring therein tending to urge the plunger against the ring to press the ring against the extreme end of the loop head and against the yielding resistance of which the ring is movable.

13. A horn button operating device to be mounted upon the steering wheel of a motor vehicle, including a sectional ring, a radius rod intersecting the ring at the juncture of contiguous sections, a coupling sleeve having longitudinal and transverse bores into which the ends of the ring sections and radius rod extend, the contiguous ends of the ring sections and radius rod being shaped for interlocking engagement one with another within the sleeve, the sleeve being contracted to maintain the interlocking engagement of the ring sections and radius rods with each other.

14. In a construction of the character described, a ring comprising succeeding joined sections, a radius rod joined to the ring coincident with the juncture of the ring sections, the radius rod having oppositely disposed notches therein into which the ends of the ring sections project, and a coupling sleeve enclosing the contiguous ends of the ring sections and radius rod holding said parts in their assembled relation.

15. In a construction of the character described, a ring comprising succeeding joined sections, a radius rod joined to the ring coincident with the juncture of the ring sections, heads formed upon the contiguous ends of the ring sections between which the end of the radius rod projects, and a coupling sleeve enclosing the contiguous ends of the ring sections and radius rod and contracted about the heads of the ring sections to maintain said parts in assembled relation.

16. In a construction of the character described, a ring comprising succeeding joined sections, a radius rod joined to the ring coincident with the juncture of the ring sections, said parts being arranged with the end of the radius rod projecting transversely intermediate the ends of the ring sections, and a coupling sleeve conforming to and closely enclosing the contiguous ends of said members.

GEORGE E. PETERS.
LINUS E. RUSSELL.